(12) United States Patent
Wilda

(10) Patent No.: US 6,959,607 B2
(45) Date of Patent: Nov. 1, 2005

(54) DIFFERENTIAL PRESSURE SENSOR IMPULSE LINE MONITOR

(75) Inventor: Douglas W. Wilda, Santa Clara, CA (US)

(73) Assignee: Honeywell International Inc., Morristown, NJ (US)

(*) Notice: Subject to any disclaimer, the term of this patent is extended or adjusted under 35 U.S.C. 154(b) by 24 days.

(21) Appl. No.: 10/704,856

(22) Filed: Nov. 10, 2003

(65) Prior Publication Data

US 2005/0097963 A1   May 12, 2005

(51) Int. Cl.[7] .................................. G01L 13/02
(52) U.S. Cl. ....................... 73/716; 303/122.09
(58) Field of Search .............. 73/716, 736; 701/34; 303/122.09

(56) References Cited

U.S. PATENT DOCUMENTS

| | | | |
|---|---|---|---|
| 5,606,513 A | 2/1997 | Louwagie et al. | |
| 5,680,409 A | 10/1997 | Qin et al. | |
| 5,940,290 A | 8/1999 | Dixon | |
| 5,948,989 A * | 9/1999 | Ichikawa et al. | 73/708 |
| 5,956,663 A | 9/1999 | Eryurek | |
| 6,012,005 A * | 1/2000 | Gscheidle et al. | 701/34 |
| 6,017,143 A | 1/2000 | Eryurek et al. | |
| 6,041,659 A | 3/2000 | Wilda et al. | |
| 6,119,047 A | 9/2000 | Eryurek et al. | |
| 6,741,919 B1 * | 5/2004 | Schuster et al. | 701/34 |
| 6,843,537 B2 * | 1/2005 | Babala et al. | 303/122.09 |
| 2004/0015282 A1 * | 1/2004 | Babala et al. | 701/70 |

OTHER PUBLICATIONS

Noon, D., "Why self-validating devices?," InTech, an ISA Publication, pp. 50-53, Oct. 2000.

* cited by examiner

Primary Examiner—Edward Lefkowitz
Assistant Examiner—Andre Allen
(74) Attorney, Agent, or Firm—Crompton, Seager & Tufte, LLC.

(57) ABSTRACT

A system for monitoring the condition of impulse lines to a differential pressure sensor. The lines may be connected at two locations of a pressure source, such as a pipe having a fluid flow. One line may direct a pressure of the source to one side of a piezoelectric diaphragm and another line may direct another pressure to the other side of the piezoelectric diaphragm. The diaphragm may provide an electrical indication of the differential pressure between both sides of the diaphragm. One of the lines may also be connected to a piezoelectric diaphragm of a static pressure sensor. The latter diaphragm may provide an electrical indication of static pressure. Detection and comparison of noise levels of the electrical indications of the pressures may indicate if one or both lines are plugged, and which one if not both.

11 Claims, 6 Drawing Sheets

| Blockage | | Signal Noise | |
|---|---|---|---|
| Line 12 | Line 13 | Differential 51 | Static 52 |
| Open | Open | Noise -- | Noise -- |
| Blocked | Open | Noise ↑ | Noise ↓ |
| Open | Blocked | Noise ↑ | Noise -- |
| Blocked | Blocked | Noise ↓ | Noise ↓ |

DIFFERENTIAL PRESSURE SENSOR IMPULSE LINE MONITOR

BACKGROUND

The invention pertains to sensing devices and particularly to pressure sensing devices. More particularly, it pertains to diagnosis of pressure sensing devices.

In differential pressure sensors, one common field problem is the plugging of impulse lines. These lines are pipes or tubes that connect the sensor to the differential pressure producing element. In some cases, a blockage of the impulse line can create a pressure in the line that, when measured by the pressure differential reading of the sensor, will be on-scale thereby indicating normal operation while the process being monitored may have changed flow rates substantially. Despite the apparent normal operation, the sensor may actually be providing an erroneous output and reading. An illustrative example of such pressure sensor may be disclosed in U.S. Pat. No. 6,041,659, issued Mar. 28, 2000, to Douglas W. Wilda et al., entitled "Methods and Apparatus for Sensing Differential and Gauge Static Pressure in a Fluid Line", which is hereby incorporated by reference in the present specification.

SUMMARY

The present invention may detect abnormal operation of the differential pressure sensor despite the appearance of normal operation. This undetected abnormal operation may be due to one or more plugged impulse lines. A comparison may be made of noise from the differential pressure sensor and noise from a static pressure sensor on the same line or pipe. Comparison results may indicate which line is blocked or if both are blocked.

DESCRIPTION

Figure 1:
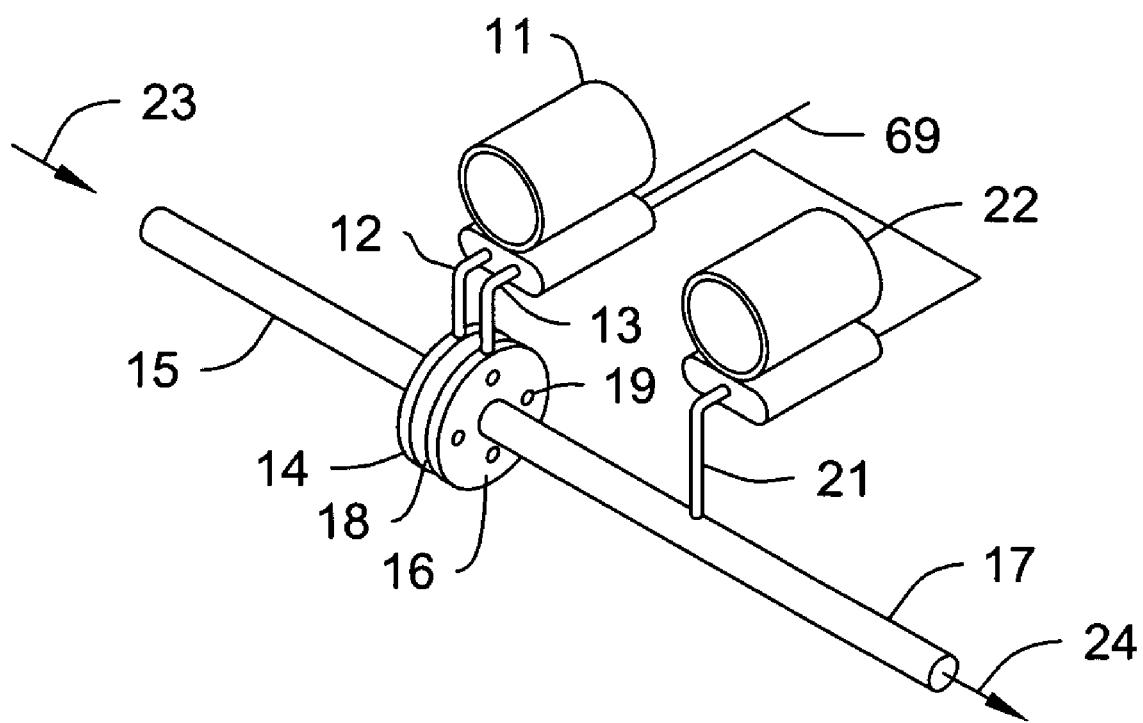
FIG. 1 is an illustrative example of a differential and static pressure sensor system with three lines to the measured pressure source.

An illustrative differential pressure sensor 11 is shown in FIG. 1. It may have a tube or line 12 connected to a flange or fitting 14 connected to an end of a pipe 15. A tube or line 13 may similarly be connected to another flange or fitting 16 connected to an end of a pipe 17. A spacer or orifice plate 18 may be placed between flanges 14 and 16 with bolts 19 or the like holding the flange 14, spacer 18 and flange 16 together. Flanges 14 and 16 may be attached to the ends of pipes 15 and 17, respectively, with a weld, brazed bead, machined thread, or other like fastening approach. Tubes 12 and 13 may be fitted on to holes in flanges 14 and 16, respectively, with similar fastening techniques. The holes may reach down into the flow area of pipes 15 and 17. The diameter and area for flow through pipes 15 and 17, flanges 14 and 16, and spacer 18 may be the same.

Pressures may be measured through tubes 12 and 13 via the holes in flanges 14 and 16, respectively, to the flow area of the pipes. Another tube 21 may be attached to pipe 17 with a hole to the flow region of the pipe. Likewise, pressure may be measured through tube 21 pipe via the hole in pipe 17. At the other ends of tubes 12 and 13 not connected to the flanges is differential pressure sensor 11. The other end of tube 21 not connected to pipe 17 may be connected to a pressure sensor 22. Pressure sensor 22 may measure absolute pressure or gauge pressure of the flow 24 downstream from differential pressure sensor 11. On the other hand, tube 21 may be inserted into pipe 15 for an upstream flow pressure measurement. Incidentally, it may be desirable to measure static pressure as gauge pressure rather than absolute pressure since it may be easier to calibrate sensors using an atmospheric pressure rather than a vacuum as a reference pressure. However, the present diagnostics system may be used with absolute or gauge static pressure measurements.

Electrical circuitry of the present invention, i.e., the differential pressure sensor impulse line monitor, may be designed to operate with currents of no more than 3.8 milliamps, voltages of no more than 12 volts, and power of no more than 50 milliwatts. Electrical signals representative of the sensed differential pressure may be conveyed from sensor 11 via a wire or optical fiber to a processor within the sensor 11 housing. Electrical or optical signals representative of the sensed gauge or absolute pressure may be conveyed from sensor 22 via a wire or optical fiber to the processor in sensor 11. Transmission of these electrical signals from sensor 22 to 11 may instead be sent to the processor in the sensor 11 housing. On the other hand, signals from sensor 11 may be sent to a processor in the sensor 12 housing. An external processor may used. At output line 69 may be the results from the processor sent to a computer, display, process equipment, system or the like for diagnostic review, storage, system control, computations and/or review. Signal transmission may be by non-wireless (e.g., wire or optical fiber) or wireless (e.g., RF or IR) and in a variety of digital or analog formats.

Figure 2:
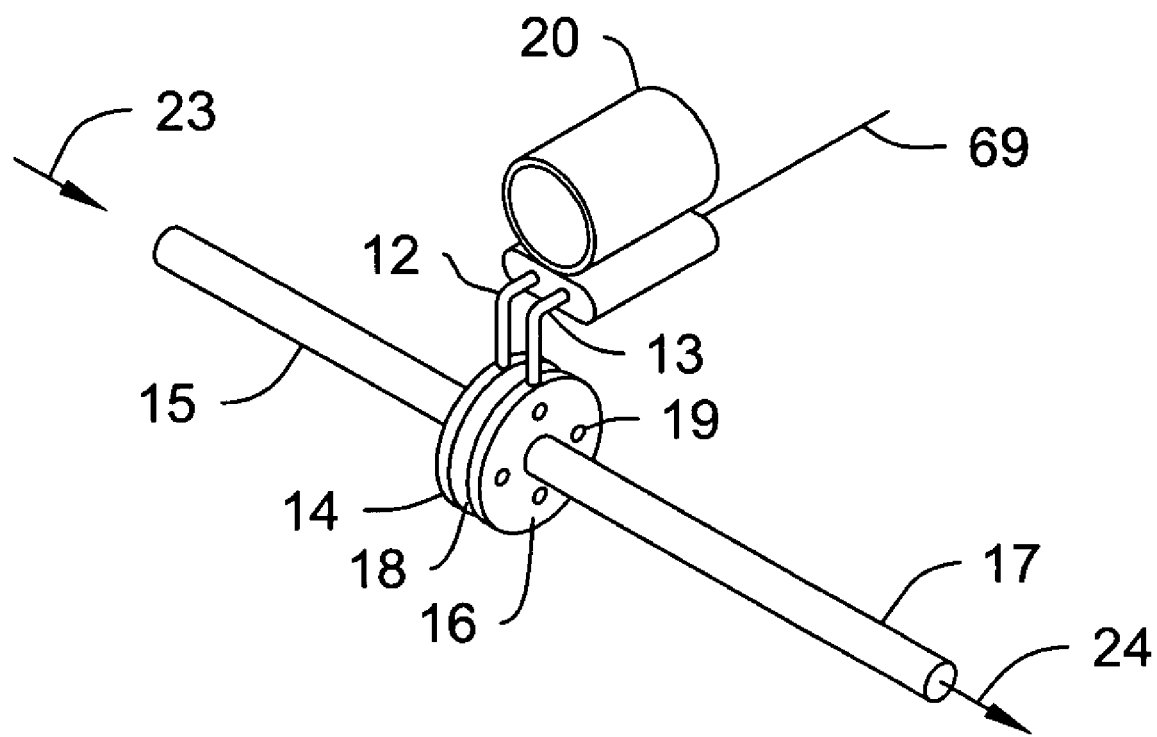
FIG. 2 is an illustrative example of an integrated differential and static pressure system with two lines to the pressure source.

Another pressure measurement approach in lieu of tube 21 connected to pipe 17 could be having the upstream 23 or downstream 24 flow pressure measurement, whether gauge or absolute, taken from tube 12 or 13, respectively, with a pressure sensor similar to sensor 22 situated within a structure like that of pressure sensor 20, as shown in FIG. 2. Transmission of signals representative of the differential pressure and gauge or absolute pressure may be sent to a processor within the sensor 20 housing. An external processor may be used. At output line 69 may be the results from the processor sent to a computer, display, process equipment, system or the like for diagnostic review, storage, system control, computations and/or review. Signal transmission may be by non-wireless (e.g., wire or optical fiber) or wireless (e.g., RF or IR) and in a variety of digital or analog formats.

Figure 3:
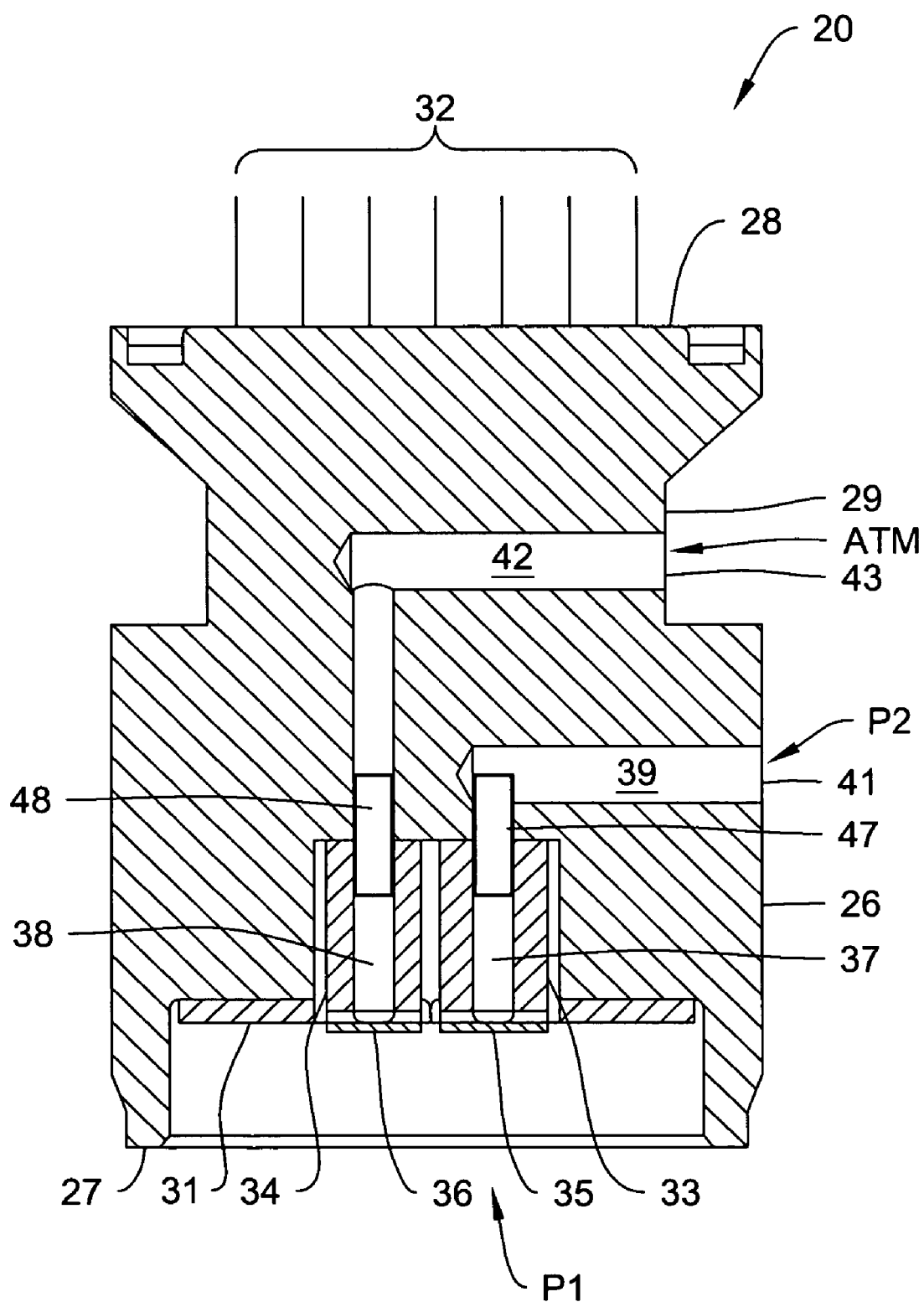
FIG. 3 is a sectional view of a differential and static pressure device.
Figure 4:
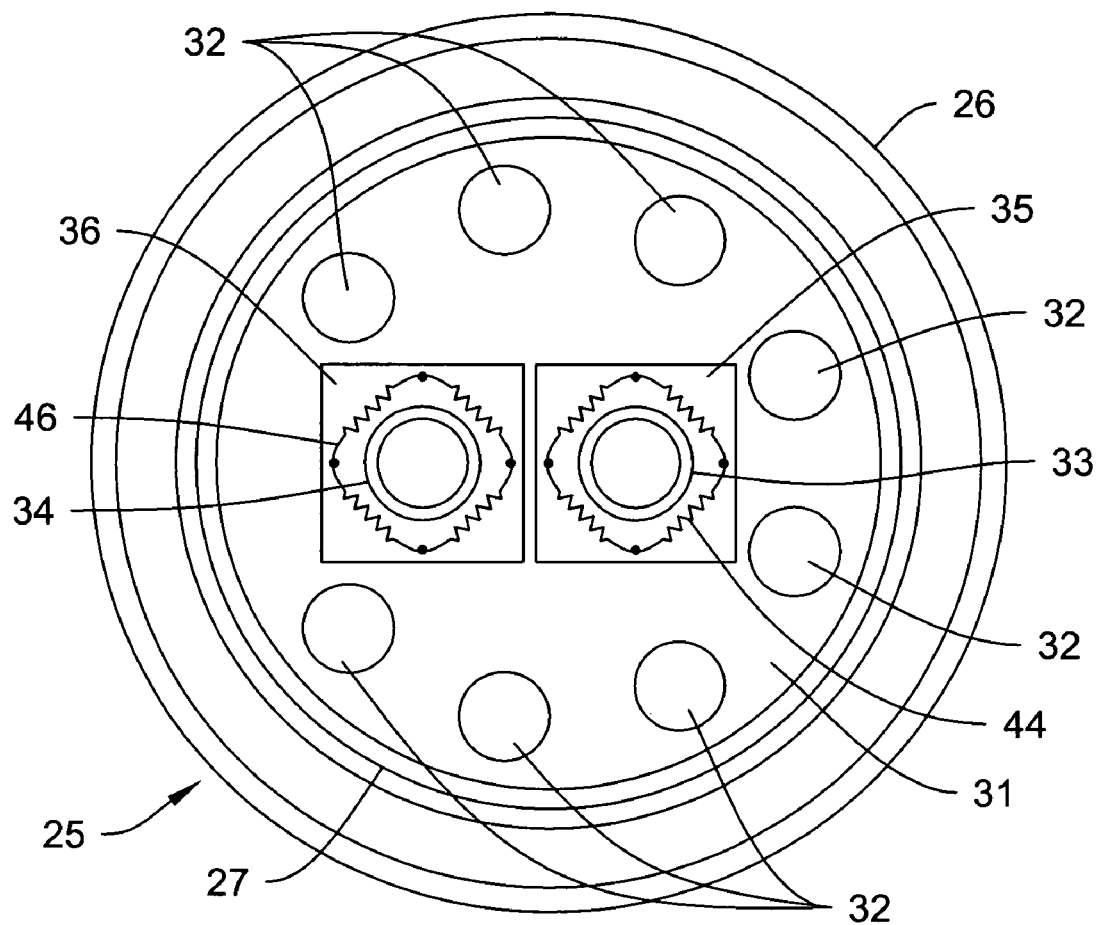
FIG. 4 is an end view of the device in FIG. 3.

An illustrative example of a differential pressure sensor and static pressure system 20 is shown in FIGS. 3 and 4. A sensor header 25 may include a substantially cylindrical package 26 having a first end 27 and a second end 28 with a decreased diameter waist area 29 in between, as shown in FIG. 3. A recessed circuit board 31 may be mounted near the first end 27 and a plurality of electrical connection pins 32 may extend from second end 28. Pins 32 may extend to circuit board 31 as seen in an end view as in FIG. 4. Two glass tubes 33, 34 may be centrally located and extend through circuit board 31 into the interior of package 26. Two piezoresistive silicon membranes or diaphragms 35, 36 may be mounted on respective ends of tubes 33, 34, respectively, of circuit board 31. Circuit board 31 may contain a processor for processing the various pressure measurements into diagnostic information.

Glass tube 33 may have a central bore 37 and glass tube 34 may have a central bore 38. Central bore 37 may be coupled to a first fluid port 39 which may extend to the surface of package 26 at a location 41 between first end 27 and waist 29, as shown in FIG. 2. Bore 38 may be coupled to a second fluid port 42 which may extend to the surface of package 26 at a location 43 on waist 29.

Sensor header 25 may be coupled to a conventional diaphragm assembly. Each of piezoresistive silicon membranes 35, 36 may be provided with a respective strain gauge 44, 46. First strain 44 gauge may be exposed on one side to high pressure P1 and on the other side to low pressure P2. Thus, the differential voltage from the first strain gauge may be proportional to the differential pressure dP=P1–P2. Second strain gauge 46 may be exposed on one side to high pressure P1 and on the other side to the atmosphere. Thus, the differential voltage from the second strain gauge may be proportional to the static gauge pressure P1gauge=P1–ATM. The nodes of the strain gauges may be coupled via circuit board 31 to pins 32.

Glass tubes 33, 34 may be mounted in the package with epoxy and their positions may be located with the aid of roll pins 47, 48. Attachment of the tubes may also be done by soldering. Piezoresistive silicon membranes or diaphragms 35, 36 may be bonded to respective tubes 33, 34, respectively, by thermoelectric (anodic) bonding. Package 26 may be made from stainless steel although other materials may be used. Illustrative instances of dimensions may include a package having an overall length of approximately 23 mm (excluding the pins), and an overall diameter of approximately 18 mm.

Figure 5A:
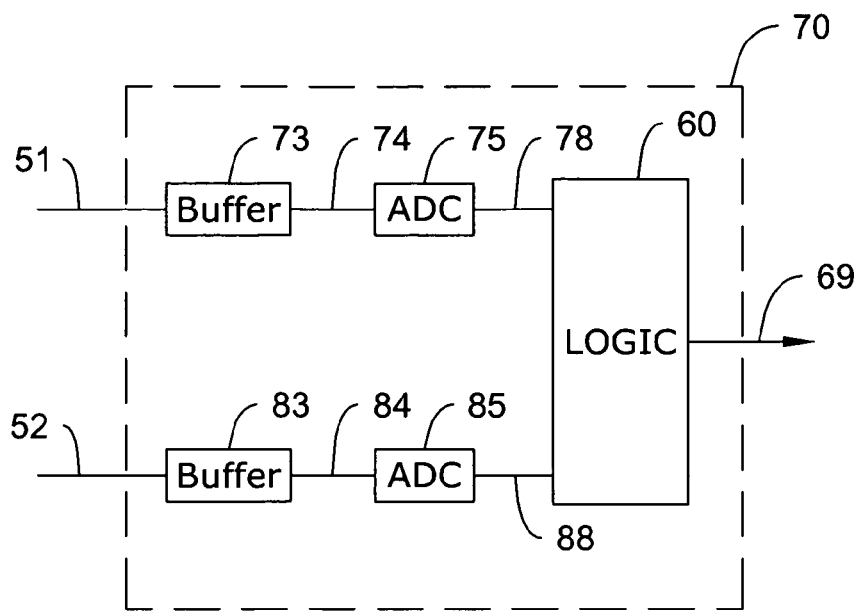
FIG. 5a is a block diagram of digital diagnostic electronics for a pressure sensor system line monitor.

FIG. 5a is a block diagram of digital diagnostic electronics for detection of blocked lines of sensor 11 or 20. Line 51 may convey a differential pressure signal to a buffer 73 which may output a signal 74 representing the differential signal including the noise level of the differential pressure signal. Signal 74 may be sent to an analog to digital converter (ADC) circuit 75. Output 58 may go to a logic circuit 60, which may be incorporated in the sensor housing. Since the pressure sensitivities of the two sensors are different, the noise level would be normalized for each sensor within logic circuit 60 so that a meaningful comparison can be made.

Line 52 may convey a static pressure signal to a buffer 83 which may output a signal 84 representing the static pressure signal and the noise level of the static pressure signal. Signal 84 may go to an ADC circuit 85. Output 88 may go to a logic circuit 60. Again, since the pressure sensitivities of the two sensors are different, the noise level would be normalized for each sensor within logic circuit 60 so that a meaningful comparison may be made.

Figure 5B:
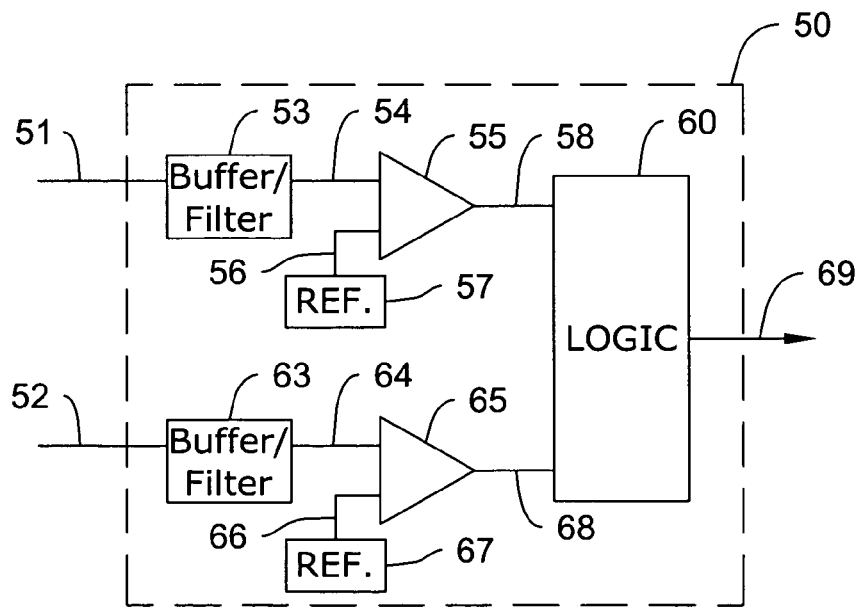
FIG. 5b is a block diagram of analog diagnostic electronics for a pressure sensor system line monitor.

FIG. 5b is a block diagram of analog diagnostic electronics for detection of blocked lines of sensor 11 or 20. Line 51 may convey a differential pressure signal to a buffer and filter 53 which may output a signal 54 representing the noise level of the differential pressure signal. Signal 54 may represent the level of an RMS, peak, or peak-to-peak or other representative value of the noise. Signal 54 may be sent to a comparator-like circuit 55. Also input to circuit 55 from a reference source 57 is a signal 56 representing the normal noise level of a signal from differential pressure sensor functioning normally with impulse lines 12 and 13 open. Three outputs from circuit 55 may occur. Output 58 of circuit 55 may indicate that the noise signal 54 is greater than, about equal to, or less than the normal noise level signal 56. Thresholds and hysteresis levels may be set for determining what is defined as greater, equal or less, and how much certain values need to change in order to return to previous indications, respectively. Output 58 may go to a logic circuit 60, which may be incorporated in the sensor housing. Since the pressure sensitivities of the two sensors are different, the noise level would be normalized for each sensor so that a meaningful comparison can be made.

Line 52 may convey a static pressure signal to a buffer and filter 63 which may output a signal 64 representing the noise level of the static pressure signal. Signal 64 may represent the level of an RMS, peak, or peak-to-peak or other representative value of the noise. Signal 64 may go to a comparator-like circuit 65. Also input to circuit 65 from a reference source 67 is a signal 66 representing the normal noise level of a signal from static pressure sensor 22 functioning normally with impulse lines 12 and 13 open. Three outputs from circuit 65 may occur. Output 68 of circuit 65 may indicate that the noise signal 64 is greater than, about equal to or less than the normal noise level signal 66. Output 68 may go to a logic circuit 60. Again, since the pressure sensitivities of the two sensors are different, the noise level would be normalized for each sensor so that a meaningful comparison can be made.

Logic circuit 60 may take inputs and output a diagnostic signal 69 indicating whether both lines 12 and 13 are blocked, one line is blocked and which one, or no lines are blocked. Circuit 60 may be designed to interface appropriately with digital or analog input signals. Output signal 69 may go to a computer, display, process equipment, system or the like for diagnostic review, storage, system control, computations and/or review. Signal 69 may have other kinds of destinations. Signal transmission may be by various kinds of media and in a variety of digital or analog formats.

Figures 6, 7:
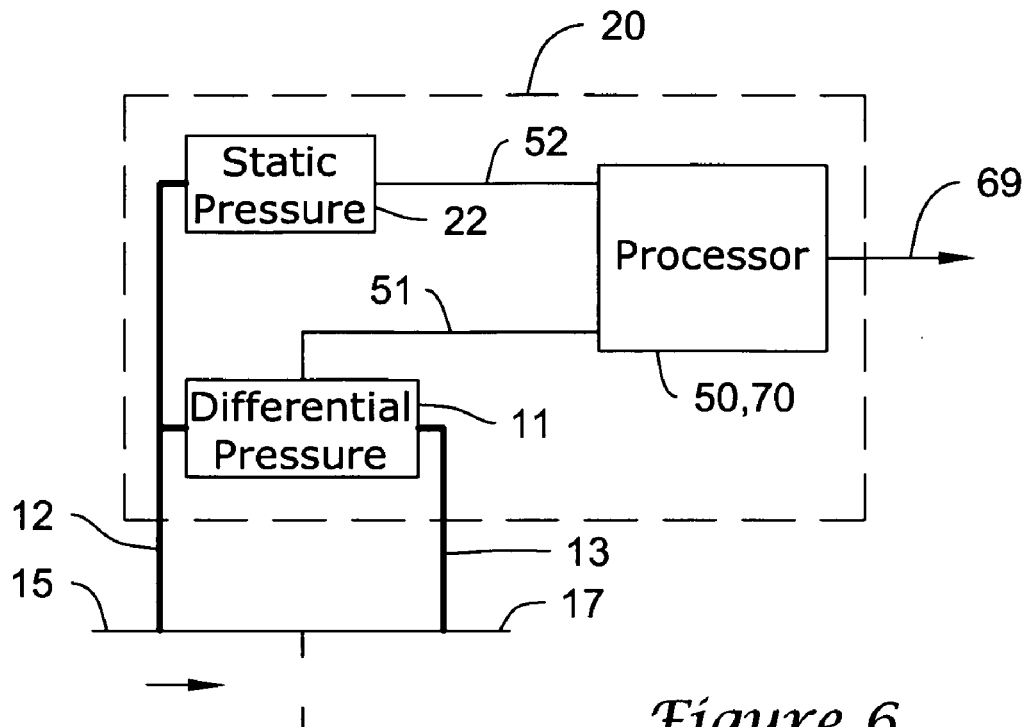
FIG. 6 reveals a configuration of line connections of the differential and static pressure devices for the system line monitor.
FIG. 7 is a table show diagnostic results based on noise levels of signals from the pressure sensor system.

FIG. 6 reveals the configuration of the line connections of the differential 11 and static 22 pressure devices within sensor enclosure 20 utilized for obtaining the illustrative diagnostic results as shown in a table 61 of FIG. 7 based on the various noise levels on the signals from pressure devices 11 and 22. Static pressure sensing device 22 may be connected to the high side of the flow which is through line 12. Normal noise levels may be on signals from connections 51 and 52 from the differential pressure 11 and static pressure 22 diaphragms 35 and 36 along with strain gauges 44 and 46, respectively, when lines 12 and 13 are open and sensor 20 is operating in a normal fashion. If the noise level of the signal on connection 51 from the differential pressure 11 diaphragm is greater (↑) than the normal noise level and the noise level of the signal on connection 52 from the static pressure 22 diaphragm is less (↓) than the normal noise level, then line 12 may be blocked and line 13 may be open. If the noise level of the signal on connection 51 from the differential pressure 11 diaphragm is greater than the normal noise level and the noise level of the signal on connection 52 from the static pressure 22 diaphragm is about equal (--) to the normal noise level, then line 12 may be open and line 13 may be blocked. If the noise level of the signal on connection 51 from the differential pressure 11 diaphragm is less than the normal noise level and the noise level of the signal on connection 52 from the static pressure 22 diaphragm is less than the normal noise level, then lines 12 and 13 may be blocked.

Although the invention has been described with respect to at least one illustrative embodiment, many variations and modifications will become apparent to those skilled in the art upon reading the present specification. It is therefore the intention that the appended claims be interpreted as broadly as possible in view of the prior art to include all such variations and modifications.

What is claimed is:

1. A method for monitoring a pressure sensor, comprising:
    receiving a first signal indicating a differential pressure from the pressure sensor having first and second lines connected to a source of pressure;
    receiving a second signal indicating a static pressure from the pressure sensor;
    normalizing the first and second signals;
    detecting a first noise level of the first signal when the first and second lines are open;
    detecting a second noise level of the second signal when the first and second lines are open;
    monitoring the noise levels of the first and second signals; and
    recognizing a malfunction of at least one of the first and second lines if the noise level of at least one of the first and second signals is not about the same as the first or second level of noise.

2. The method of claim 1, further comprising recognizing the first line to be substantially blocked and the second line to be substantially open if the noise level of the first signal is greater than the first noise level and the noise level of the second signal is less than the second noise level.

3. The method of claim 2, further comprising recognizing the first line to be substantially open and the second line to be substantially blocked if the noise level of the first signal is greater than the first noise level and the noise level of the second signal is about the same as the second noise level.

4. The method of claim 3, further comprising recognizing the first and second lines to be substantially blocked if the noise level of the first signal is less than the first noise level and the noise level of the second signal is less than the second noise level.

5. Means for detecting a plugged line of a pressure sensor having first and second lines connected to a pressure source, an output means for providing a first signal for indicating a differential pressure between the first and second lines, and for providing a second signal for indicating a static pressure of at least one line, comprising:
    means for indicating a noise level of a signal; and
    wherein:
        a first noise level of the first signal and a second noise level of the second signal indicate the first and second lines to be open; and
        a noise level of at least one of the first and second signals that is not approximately equal to the first or second level of noise, respectively, is indicative of at least one of the first and second lines to be approximately plugged.

6. The means of claim 5, wherein a noise level of the first signal greater than the first noise level and a noise level of the second signal less than the second noise level is indicative of one approximately plugged line and one approximately open line.

7. The means of claim 6, wherein a noise level of the first signal greater than the first noise level and a noise level of the second signal about the same as the second noise level is indicative of one approximately open first line and one approximately plugged second line.

8. The means of claim 7, wherein a noise level of the first signal less than the first noise level and a noise level of the second signal less than the second noise level are indicative of two approximately plugged lines.

9. The system of claim 11, wherein substantially open first and second lines result in a normal noise level on the first and second outputs.

10. The system of claim 9, wherein:
    a greater than normal noise level on the first output and a normal or less than normal noise level on the second output is indicative of one substantially blocked line; and
    less than normal noise levels on the first and second outputs are indicative of substantial blockage of the first and second lines.

11. A system for monitoring a pressure sensor having first and second lines and having a first output for indicating a differential pressure of the first and second lines and a second output for indicating a pressure of one of the first and second lines, comprising:
    a noise level detector connected to the first and second outputs;
    a noise level comparator connected to the noise level detector; and
    a line condition indicator connected to the noise level comparator; and
    wherein the line condition indicator is for indicating at least one substantially plugged or substantially open line based on noise levels of the first and second outputs.

* * * * *